US012356173B2

(12) United States Patent
Ren et al.

(10) Patent No.: US 12,356,173 B2
(45) Date of Patent: Jul. 8, 2025

(54) SOUND DEVICE

(71) Applicant: AAC Microtech (Changzhou) Co., Ltd., Jiangsu (CN)

(72) Inventors: Li Ren, Changzhou (CN); Chao Zhang, Changzhou (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 304 days.

(21) Appl. No.: 18/325,075

(22) Filed: May 29, 2023

(65) Prior Publication Data

US 2024/0187797 A1 Jun. 6, 2024

Related U.S. Application Data

(63) Continuation of application No. PCT/CN2022/136721, filed on Dec. 6, 2022.

(51) Int. Cl.

| | |
|---|---|
| ***H04R 3/00*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |
| *H04R 3/02* | (2006.01) |

(52) U.S. Cl.
CPC ............... *H04R 9/063* (2013.01); *H04R 3/00* (2013.01); *H04R 7/04* (2013.01); *H04R 7/18* (2013.01); *H04R 9/025* (2013.01); *H04R 9/046* (2013.01); *H04R 2400/11* (2013.01)

(58) Field of Classification Search
CPC . H04R 9/063; H04R 3/00; H04R 7/04; H04R 7/18; H04R 9/025; H04R 2400/11
USPC .................................................. 381/117, 342
See application file for complete search history.

(56) References Cited

U.S. PATENT DOCUMENTS

2003/0003879 A1* 1/2003 Saiki ..................... H04R 9/046
379/433.02

* cited by examiner

*Primary Examiner* — Ammar T Hamid
(74) *Attorney, Agent, or Firm* — Wiersch Law Group

(57) ABSTRACT

The present disclosure discloses a sound device including a frame, a magnet system, a first vibration system and a second vibration system. The magnet system includes a first inner yoke, a main magnet, a side magnet, a first side yoke, and a connection portion. A first coil of the first vibration system is inserted in to a first magnetic gap. A first FPC of the first vibration system includes a first fixation portion, a first welding portion welded to the first coil, and a first elastic portion connecting the first fixation portion with the first welding portion; the first elastic portion is spaced apart from the first side yoke along a vibration direction; the first welding portion is fixed to a side of the first side yoke facing the first diaphragm. The sound device has better magnetic field performance and vibration performance.

9 Claims, 5 Drawing Sheets

SOUND DEVICE

FIELD OF THE PRESENT DISCLOSURE

The present disclosure relates to electric-sound conversion technologies, especially relates to a sound device applied in portable mobile terminals.

DESCRIPTION OF RELATED ART

With the development of the portable mobile terminal technologies, users have increasingly high requirements for the sound quality of portable mobile terminals. And a sound device in portable mobile terminals is one of the necessary conditions to achieve this high-quality sound effect In related art, the sound device normally includes a frame, and a vibration system and a magnet system both mounted on the frame. The magnet system includes a yoke, a main magnet fixed to the yoke, a side magnet fixed to the frame, a main pole plate fixed to the main magnet, and a side pole plate fixed to the side magnet. The vibration system includes a diaphragm, a coil configured to drive the diaphragm, and a FPC arranged between the diaphragm and the coil; a solder pad is provided on the FPC. Usually, to avoid the significant loss of magnetic field BL caused by thinning the main pole plate for avoiding the solder pad, the solder pad is arranged outside the coil and an avoidance groove is provided on the side yoke which has less impact on the magnetic field performance. Even though, there is still loss of magnetic field BL. Besides, the FPC may collide with the side yoke during vibration, thus negatively affecting the vibration performance and reliability of the sound device.

Therefore, it is necessary to provide an improved sound device to overcome the problems mentioned above.

SUMMARY OF THE INVENTION

One object of the present disclosure is to provide a sound device having better magnetic field performance and vibration performance.

A sound device includes a frame having a receiving space; a magnet system received in the receiving space, including: a first inner yoke; a main magnet fixed to the first inner yoke; a side magnet fixed to the frame and spaced apart from the first inner yoke forming a second magnetic gap; a first side yoke fixed to the side magnet and spaced apart from the main magnet forming a first magnetic gap; and a connection portion connecting the first inner yoke with the first side yoke; a first vibration system arranged on one side of the magnet system, including: a first diaphragm fixed to the frame; a rectangular first coil inserted into the first magnetic gap and surrounding the main magnet; and a first FPC electrically connected with the first coil; a second vibration system arranged on the other side of the magnet system, including: a second diaphragm fixed to the frame; and a second coil inserted into the second magnetic gap and malposed with the first coil; the first FPC includes a first fixation portion fixed to the frame, a first welding portion welded to the first coil, and a first elastic portion connecting the first fixation portion with the first welding portion; the first elastic portion is spaced apart from the first side yoke along a vibration direction; the first welding portion is fixed to a side of the first side yoke facing the first diaphragm.

As an improvement, the first FPC further includes a first bending portion bending from one end of the first elastic portion away from the first fixation portion and extending towards the first side yoke; the first welding portion extends from one end of the first bending portion away from the first elastic portion.

As an improvement, the frame is in a rectangle shape; the first elastic portion extends along a long axis of the frame.

As an improvement, a protrusion extending towards the first coil is provided on the frame; the first elastic portion is fixed to one side of the protrusion facing the first diaphragm; the first bending portion is fixed to the protrusion.

As an improvement, the side magnet is fixed to the frame along the long axis; the connection portion connected the first inner yoke with an edge of the first side yoke along a short axis.

As an improvement, a projection of the first coil is located inside of the second coil along the vibration direction.

As an improvement, the magnet system further includes a second inner yoke fixed to one side of the main magnet away from the first inner yoke, and a second side yoke fixed to one side of the side magnet facing the second diaphragm.

As an improvement, the second vibration system further includes a second FPC electrically connected with the second coil; the second FPC includes a second fixation portion fixed to one end of the second coil away from the second diaphragm, a second welding portion fixed to the frame, a second elastic portion connecting the second fixation portion with the second welding portion, and a third welding portion extending from the second fixation portion to outside of the second coil; the second coil is electrically connected with the third welding portion.

As an improvement, the second vibration system further includes two second FPCs; two second FPCs are arranged on two opposite sides of the second coil along a short axis.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
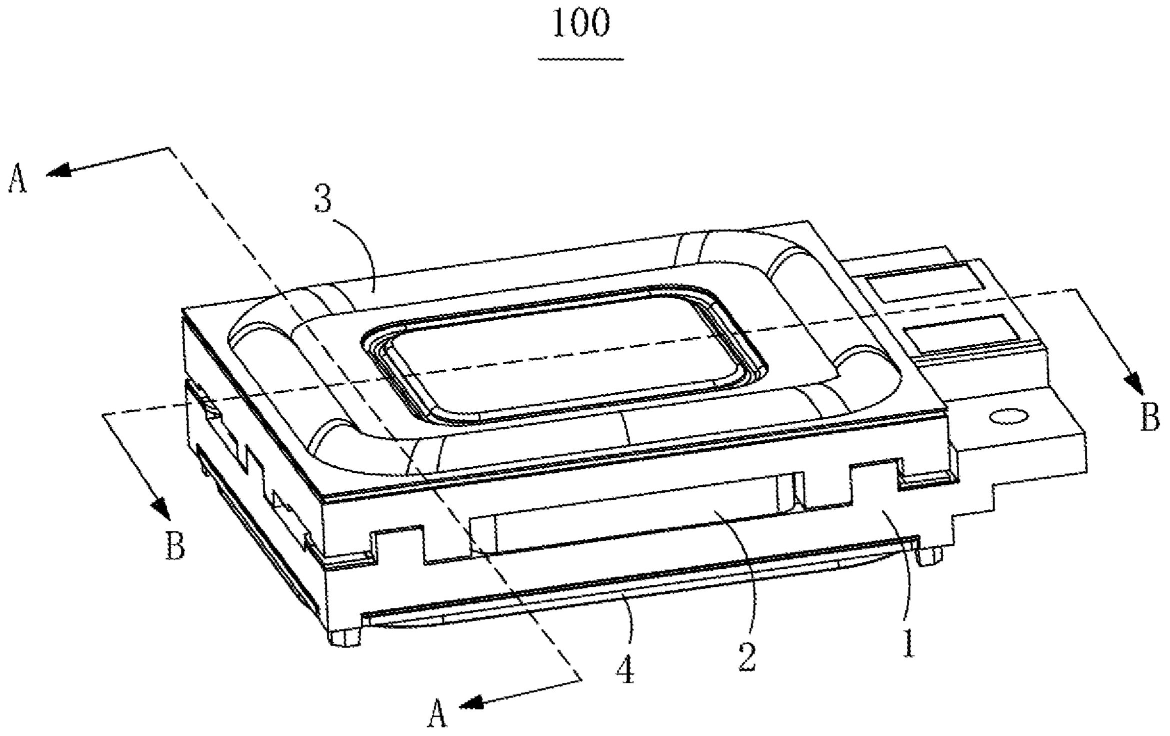
FIG. 1 is an isometric view of a sound device in accordance with an exemplary embodiment of the present disclosure.
Figure 2:
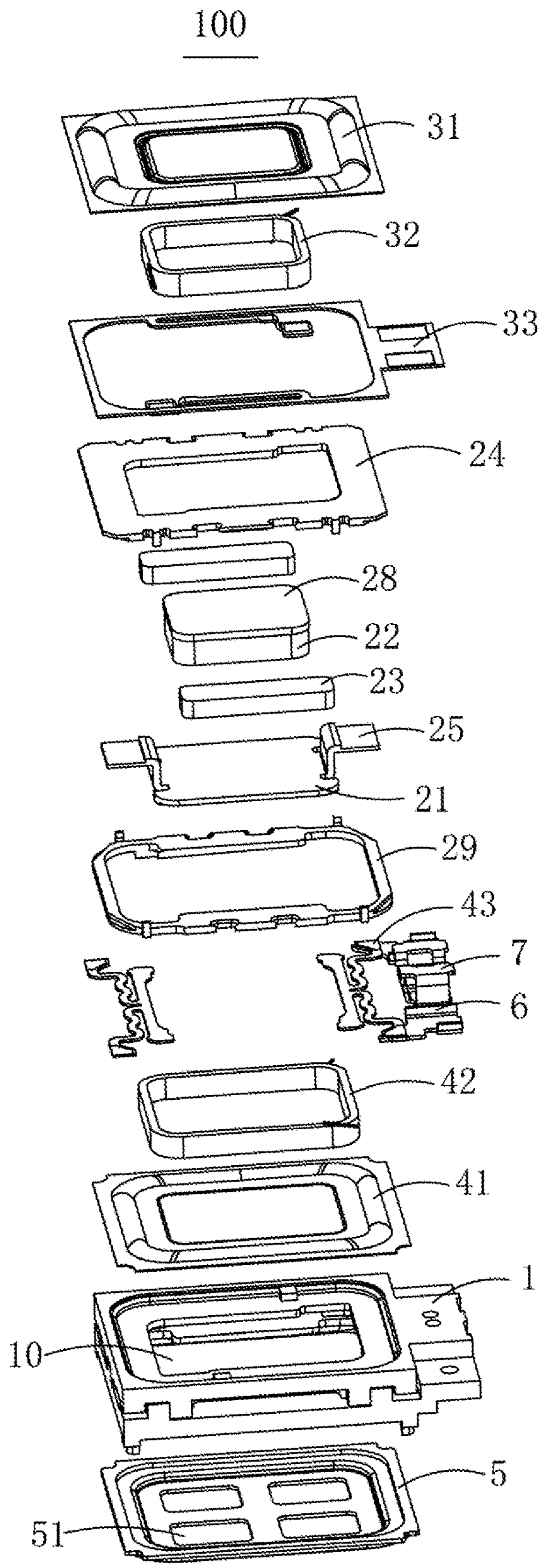
FIG. 2 is an exploded view of the sound device in FIG. 1.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-7, a sound device 100 provided by an exemplary embodiment of the present disclosure includes a frame 1 having a receiving space 10, a magnet system 2 received in the receiving space 10, and a first vibration system 3 and a second vibration system 4 separately arranged on two sides of the magnet system 2. The first vibration system 3 and the second vibration system 4 are separately mounted on two opposite sides of the frame 1.

The magnet system 2 includes a first inner yoke 21, a main magnet 22 fixed to the first inner yoke 21, a side yoke 23 fixed to the frame 1, a first side yoke 24 fixed to one side of the side magnet 23 facing the first vibration system 3, and a connection portion 25 connecting the first inner yoke 21 and the first side yoke 24. Therefore, a first magnetic gap 26 is formed between the first side yoke 24 and the main magnet 22; a second magnetic gap 27 is formed between the first inner yoke 21 and the side magnet 23. It can be understood that the sound device 100 is in a rectangle shape. Correspondingly, the frame 1 is also rectangular. In one embodiment, the side magnet 23 is fixed to the frame 1 along a long axis. In another words, the side magnet 23 extends along the long axis of the frame 1. The connection portion 25 connects the first inner yoke 21 with an edge of the first side yoke 24 along a short axis.

Figure 3:
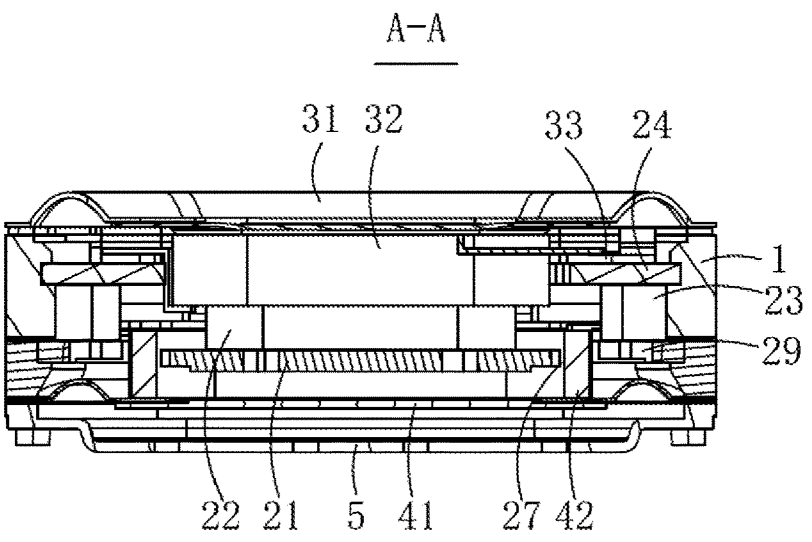
FIG. 3 is a cross-sectional view of the sound device taken along line A-A in FIG. 1.
Figure 4:
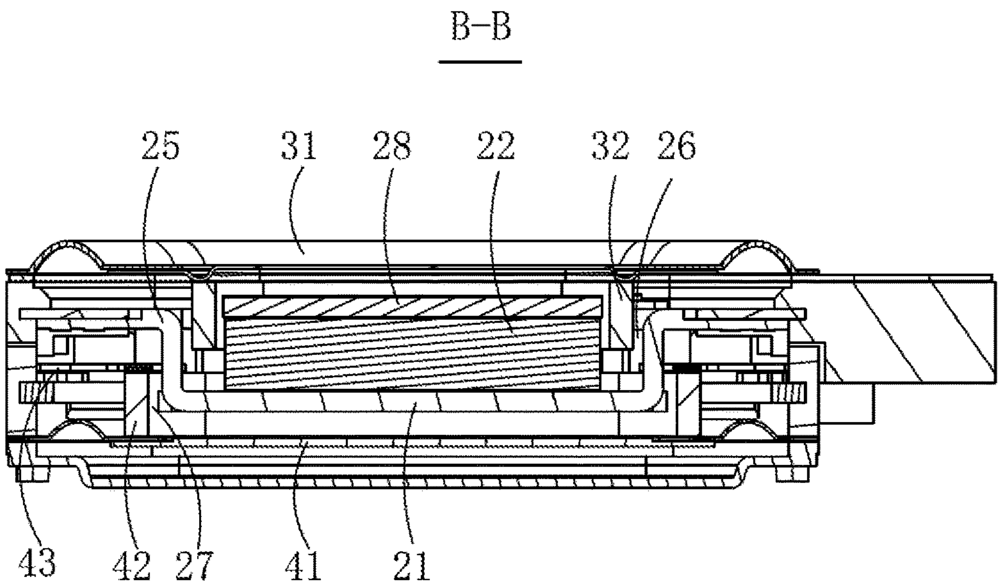
FIG. 4 is a cross-sectional view of the sound device taken along line B-B in FIG. 1.
Figure 5:
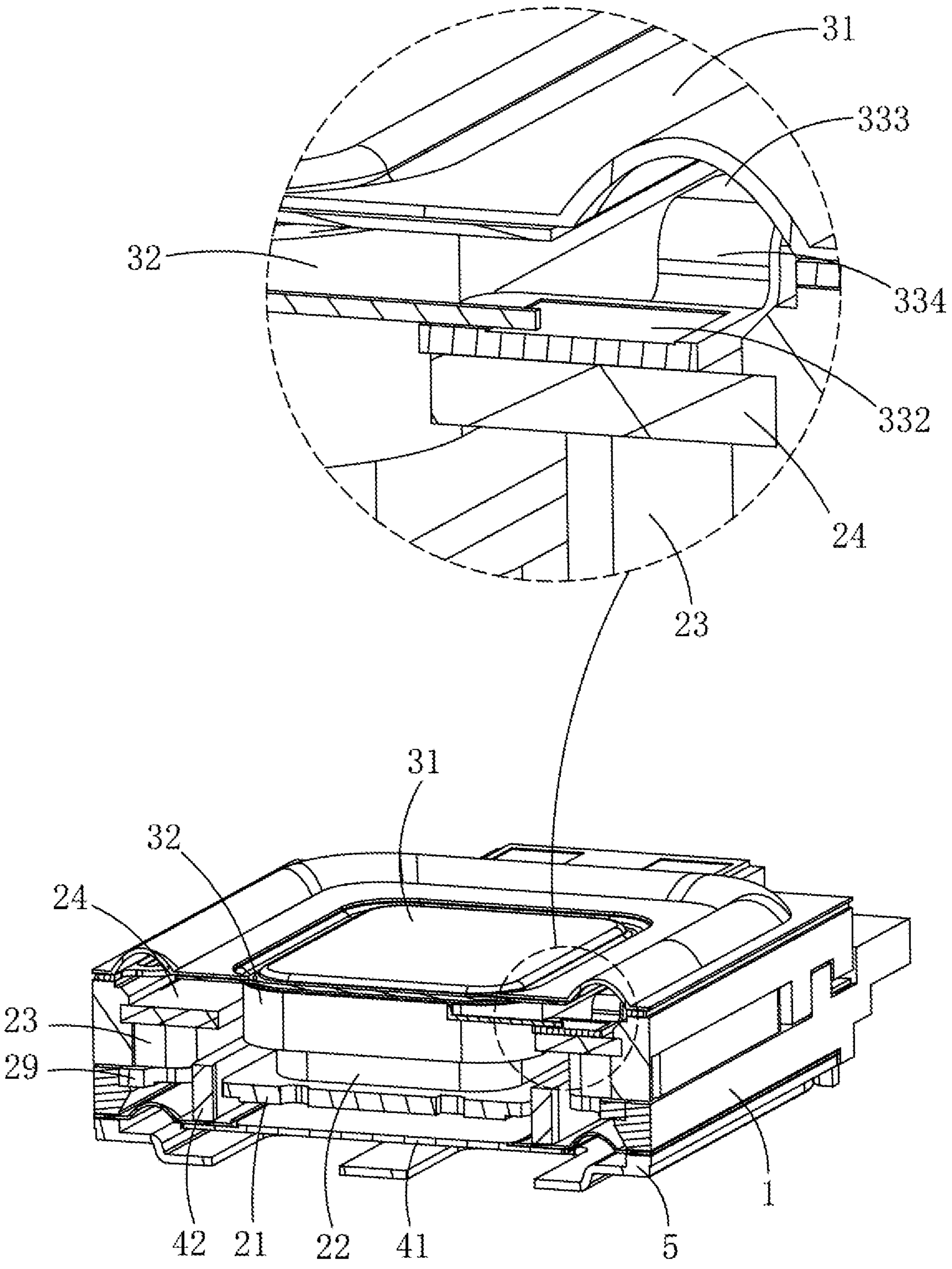
FIG. 5 is an isometric view of the sound device in FIG. 4.
Figure 6:
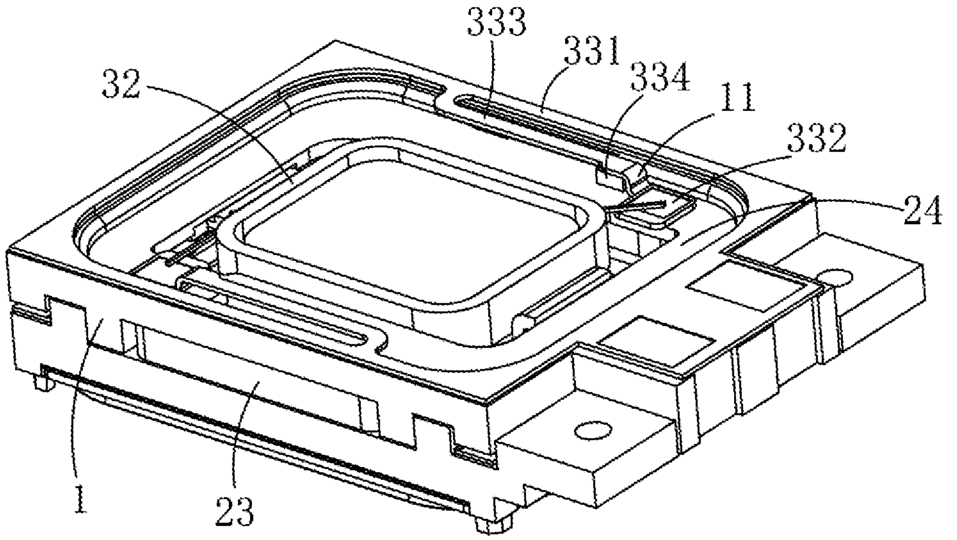
FIG. 6 is an isometric view of part of the sound device in FIG. 1.
Figure 7:
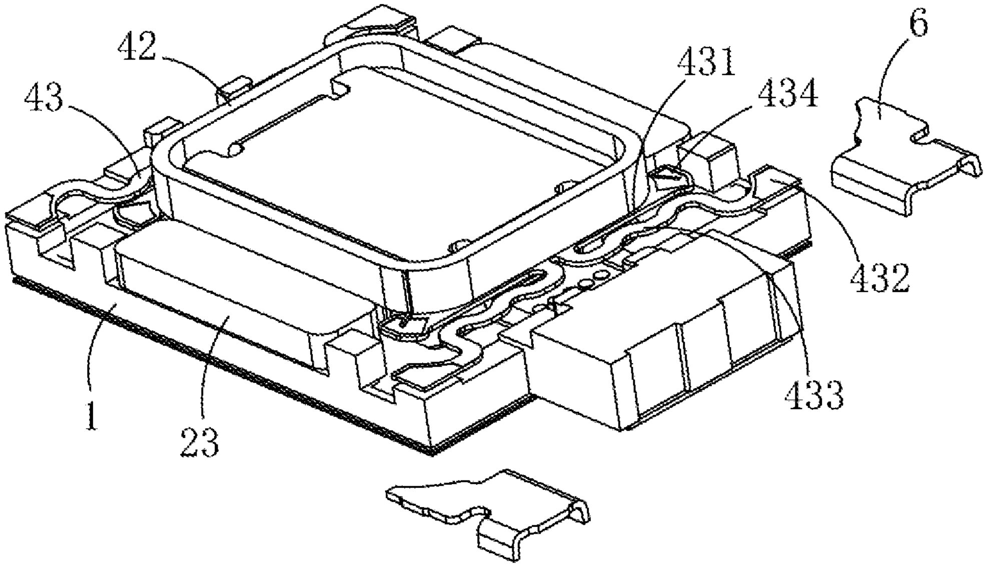
FIG. 7 is an isometric view of part of the sound device in FIG. 1.

As shown in FIGS. 3-4, the first vibration system 3 includes a first diaphragm 31 fixed to the frame 1, a first coil 32 inserted into the first magnetic gap 26, and a first FPC 33 electrically connected with the first coil 32. The first coil 32 is in a rectangle shape and surrounds the main magnet 22. The first coil 32 is electrically activated to drive the first diaphragm 31 to generate sound.

The second vibration system 4 includes a second diaphragm 41 fixed to the frame 1, a second coil 42 inserted into the second magnetic gap 27, and a second FPC 42 electrically connected with the second coil 42. The second coil 42 is malposed with the first coil 32. The second coil 42 is electrically activated to drive the second diaphragm 41 to generate sound. Specifically, a projection of the first coil 32 along a vibration direction is located inside the second coil 42. The first coil 32 and the second coil 42 are both rectangular.

Furthermore, the sound device 100 includes a front cover 5 above the second diaphragm 41. The front cover 5 is located on one side of the second diaphragm 41 away from the second coil 42. A sound hole 51 is provided on the front cover 5. The sound generated by the second diaphragm 41 is transmitted to outside through the sound hole 51.

As shown in FIGS. 2-6, the first FPC 33 includes a first fixation portion 331 fixed to the frame 1, a first welding portion 332 welded to the first coil 32, and a first elastic portion 333 connecting the first fixation portion 331 with the first welding portion 332; the first elastic portion 333 is spaced apart from the first side yoke 24 along the vibration direction; the first welding portion 332 is fixed to a side of the first side yoke 24 facing the first diaphragm 31. Specifically, the first FPC 33 further includes a first bending portion 334 bending from one end of the first elastic portion 333 away from the first fixation portion 331 and extending towards the first side yoke 24; the first welding portion 332 extends from one end of the first bending portion 334 away from the first elastic portion 333. That is, the first bending portion 334 connects the first elastic portion 333 and the first welding portion 332. By fixing to first welding portion 332 to the first side yoke 24, a height difference is formed between the first elastic portion 333 and the first welding portion 332. Thus, an avoidance groove on the first side yoke 24 is no longer needed to avoid the first welding portion 332, thereby effectively avoiding the interference between the first welding portion 332 and the first side yoke 24 during vibration, and improving the magnetic field BL of the magnet system 2 and hence strengthening the magnetic field performance.

Owing that the side magnet 23 is fixed to the frame 1 along the long axis, the first elastic portion 333 extends along the long axis. Furthermore, a protrusion 11 extending towards the first coil 32 is provided on the frame 1; the first elastic portion 333 is fixed to one side of the protrusion 11 facing the first diaphragm 31; the first bending portion 334 is fixed to the protrusion 11. In this manner, the impact of the first elastic portion 333 on the first welding portion 332 during vibration is accordingly reduced. The first welding portion 332 is fixed to the first side yoke 24 more firmly, thereby improving the reliability of the sound device 100.

The magnet system 2 further includes a second inner yoke 28 fixed to one side of the main magnet 22 away from the first inner yoke 21, and a second side yoke 29 fixed to one side of the side magnet 23 facing the second diaphragm 41.

In addition, the second FPC 43 includes a second fixation portion 431 fixed to one end of the second coil 42 away from the second diaphragm 41, a second welding portion 432 fixed to the frame 1, a second elastic portion 433 connecting the second fixation portion 431 with the second welding portion 432, and a third welding portion 434 extending from the second fixation portion 431 to outside of the second coil 42; the second coil 42 is electrically connected with the third welding portion 434. Specifically, the second vibration system 4 further includes two second FPCs 43; two second FPCs 43 are arranged on two opposite sides of the second coil 43 along the short axis In one embodiment, the sound device 100 further includes a first conductive member 6 and a second conductive member 7 both fixed to the frame 1. The second FPC 43 is electrically connected with external circuit through the first conductive member 6. The first FPC 33 is electrically connected with external circuit through the second conductive member 7.

Compared with the related art, the sound device in present disclosure includes a frame, a magnet system, a first vibration system and a second vibration system. The magnet system includes a first inner yoke, a main magnet fixed to the first inner yoke, a side magnet fixed to the frame, a first side yoke fixed to the side magnet, and a connection portion connecting the first inner yoke with the first side yoke. A first coil of the first vibration system is inserted in to a first magnetic gap formed between the main magnet and the first side yoke. A first FPC of the first vibration system includes a first fixation portion fixed to the frame, a first welding portion welded to the first coil, and a first elastic portion connecting the first fixation portion with the first welding portion; the first elastic portion is spaced apart from the first side yoke along a vibration direction; the first welding portion is fixed to a side of the first side yoke facing the first diaphragm. By fixing to first welding portion to the first side yoke, a height difference is formed between the first elastic portion and the first welding portion. Thus, an avoidance groove on the first side yoke is no longer needed to avoid the first welding portion, thereby effectively avoiding the interference between the first welding portion and the first side yoke during vibration, and improving the magnetic field BL of the magnet system and hence strengthening the magnetic field performance.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound device comprising:

a frame having a receiving space;

a magnet system received in the receiving space, comprising:

a first inner yoke;

a main magnet fixed to the first inner yoke;

a side magnet fixed to the frame and spaced apart from the first inner yoke forming a second magnetic gap;

a first side yoke fixed to the side magnet and spaced apart from the main magnet forming a first magnetic gap; and a connection portion connecting the first inner yoke with the first side yoke;

a first vibration system arranged on one side of the magnet system, comprising:

a first diaphragm fixed to the frame;

a rectangular first coil inserted into the first magnetic gap and surrounding the main magnet; and a first FPC electrically connected with the first coil;

a second vibration system arranged on the other side of the magnet system, comprising:

a second diaphragm fixed to the frame; and a second coil inserted into the second magnetic gap and malposed with the first coil; wherein the first FPC comprises a first fixation portion fixed to the frame, a first welding portion welded to the first coil, and a first elastic portion connecting the first fixation portion with the first welding portion; the first elastic portion is spaced apart from the first side yoke along a vibration direction; the first welding portion is fixed to a side of the first side yoke facing the first diaphragm.

2. The sound device as described in claim 1, wherein the first FPC further comprises a first bending portion bending from one end of the first elastic portion away from the first fixation portion and extending towards the first side yoke; the first welding portion extends from one end of the first bending portion away from the first elastic portion.

3. The sound device as described in claim 1, wherein the frame is in a rectangle shape; the first elastic portion extends along a long axis of the frame.

4. The sound device as described in claim 2, wherein a protrusion extending towards the first coil is provided on the frame; the first elastic portion is fixed to one side of the protrusion facing the first diaphragm; the first bending portion is fixed to the protrusion.

5. The sound device as described in claim 3, wherein the side magnet is fixed to the frame along the long axis; the connection portion connected the first inner yoke with an edge of the first side yoke along a short axis.

6. The sound device as described in claim 1, wherein a projection of the first coil is located inside of the second coil along the vibration direction.

7. The sound device as described in claim 1, wherein the magnet system further comprises a second inner yoke fixed to one side of the main magnet away from the first inner yoke, and a second side yoke fixed to one side of the side magnet facing the second diaphragm.

8. The sound device as described in claim 1, wherein the second vibration system further comprises a second FPC electrically connected with the second coil; the second FPC comprises a second fixation portion fixed to one end of the second coil away from the second diaphragm, a second welding portion fixed to the frame, a second elastic portion connecting the second fixation portion with the second welding portion, and a third welding portion extending from the second fixation portion to outside of the second coil; the second coil is electrically connected with the third welding portion.

9. The sound device as described in claim 8, wherein the second vibration system further comprises two second FPCs; two second FPCs are arranged on two opposite sides of the second coil along a short axis.

* * * * *